United States Patent Office 3,426,092
Patented Feb. 4, 1969

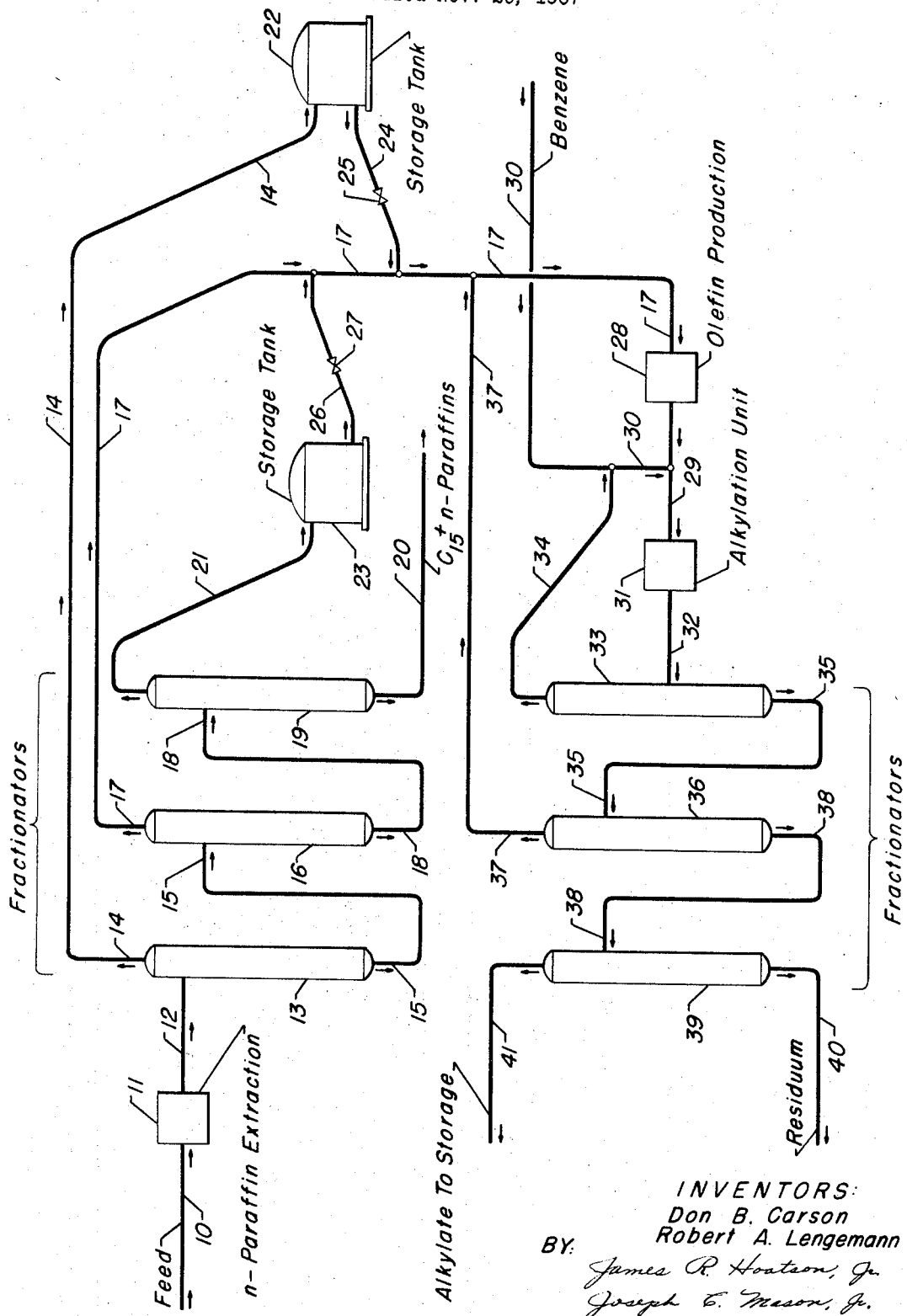

3,426,092
METHOD FOR PRODUCING DETERGENT-GRADE ALKYLATE
Don B. Carson, Mount Prospect, and Robert A. Lengemann, Arlington Heights, Ill., assignors to Universal Oil Products Company, Des Plaines, Ill., a corporation of Delaware
Filed Nov. 20, 1967, Ser. No. 684,181
U.S. Cl. 260—671
Int. Cl. C07c 3/54, 5/18

4 Claims

ABSTRACT OF THE DISCLOSURE

Method for producing detergent-grade alkylate via n-paraffin separation, n-paraffin dehydrogenation to the corresponding mono-olefin, catalytic alkylation of the olefin with benzene, and separation of the desired alkylate product. The method is applicable particularly to the production of alkylbenzenes having a 5-carbon homolog spread, such as $C_{10}$ to $C_{14}$, in the alkyl side-chain.

Background of the invention

This invention relates to a combination process for the production of detergent-grade alkylate. It specifically relates to a method for selective separation of suitable n-paraffin feedstocks for charge to a dehydrogenation reaction operating in conjunction with a benzene alkylation unit.

It has long been known that the satisfactory disposal of sewage and the inactivation of detergents dissolved in the sewage is a difficult but extremely necessary processing problem. Many of the detergents, for example, those having an alkylaryl structure as the organic portion tends to produce stable foams in hard or soft waters in such large quantities that the foam clogs sewage treatment facilities and often appears in sufficient concentration in the sewage treatment facilities to destroy the bacteria necessary for sufficient biological action on the sewage. The prior art has also known that the alkylbenzene sulfonates (ABS) detergents which are based on using propylene-tetramer as the alkylating agent for benzenes is relatively non-biodegradable and, therefore, usually undesirable in current sewage treatment plants. On the other hand, the prior art has also known that biodegradable linear alkylbenzene sulfonates (LAB) are extremely satisfactory and most desirable in the commercial market today. Present methods for producing the biodegradable detergents utilize normal paraffin hydrocarbons as a source of the straight-chain alkyl substituents. One prior art processing scheme for producing LAB has included: chlorination followed by direct alkylation of benzenes with alkyl chlorides using aluminum chloride as the catalyst; or chlorination followed by dehydrochlorination and alkylation of benzenes with the resultant olefins using an acid catalyst; and/or the cracking of higher molecular weight paraffinic hydrocarbons, such as waxes, to form suitable olefins which are then used to alkylate benzenes with an acid catalyst.

More recently, however, there has been a process accounted in which the normal paraffins are made in sufficient purity for direct catalytic dehydrogenation of the n-paraffins to the corresponding n-mono-olefins of the same carbon number. Basically, this most recent prior art process involves the extraction of, for example, kerosene to produce n-paraffins of extremely high purity. These high purity n-paraffins are catalytically dehydrogenated to n-mono-olefins. The dehydrogenation effluent is admixed with benzenes and converted to alkylbenzenes in the presence of an acid catalyst, such as hydrogen fluoride. The alkylation effluent is then separated, usually by distillation, into linear alkylbenzenes, commonly called alkylate, and a by-product heavy alkylate. It is the linear alkylbenzenes which are the desired alkylate product of sufficient purity to be called "detergent-grade." The excess n-paraffins are usually recycled to the dehydrogenation section and usually any excess benzenes are recycled to the alkylation reaction zone. A more detailed description of this latter process for producing detergent-grade linear alkylbenzenes may be found in "UOP Discloses New Way To Make Linear Alkylbenzenes," by Dr. Herman S. Bloch, Oil and Gas Journal, Jan. 16, 1967, pages 79–81. Those skilled in the art are directed to this literature article for additional details, the contents of which are incorporated herein by reference.

In the practice of the latter process for producing linear alkylbenzenes, it was found that the various alkylate homologs could not be satisfactorily separated by distillation from the n-paraffin recycle due to the fact that certain of the alkylbenzenes had the same or similar boiling point with the certain n-paraffin hydrocarbons. Accordingly, it was found virtually impossible to produce high purity detergent-grade alkylate particularly when the desired alkylate was a 5-homolog spread alkylate, such as $C_{10}$–$C_{14}$ or $C_{11}$–$C_{15}$. Therefore, the present invention is an improved method for performing the dehydrogenation-alkylation reaction of, for example, the most recent prior art method described by Bloch, supra, for producing detergent-grade linear alkylbenzene which may then be converted into biodegradable alkylbenzene sulfonates.

Summary of the invention

Therefore, it is an object of the present invention to provide an improved method for producing detergent-grade alkylate.

It is another object of this invention to provide an improved method for producing an alkylaromatic mono-alkylate suitable for conversion to a detergent product.

According to the present invention, there is provided a method for producing detergent-grade alkylate which comprises the steps of: (a) continuously introducing a first fraction comprising relatively intermediate boiling range n-paraffin hydrocarbons into a dehydrogenation reaction zone maintained under conditions sufficient to convert n-paraffin hydrocarbons into corresponding straight-chain mono-olefin hydrocarbons; (b) continuously passing the hydrocarbon effluent from said dehydrogenation reaction zone into a benzene reaction zone maintained under conditions sufficient to produce an alkylate comprising alkylbenzene hydrocarbons having an alkyl chain length corresponding to the chain length of said mono-olefin hydrocarbons; (c) recovering a first alkylate product comprising alkylbenzene having an alkyl chain length corresponding to the mono-olefin hydrocarbons produced from said first fraction; (d) periodically introducing a second fraction comprising relatively low boiling n-paraffin hydrocarbons into said dehydrogenation reaction zone in admixture with said first fraction and in the absence of hereinafter specified third fraction; (e) periodically recovering a second alkylate product comprising alkylbenzenes having an alkyl chain length corresponding to the mono-olefin hydrocarbons produced from said admixture of Step (d); (f) stopping the introduction of said second fraction as in Step (d); (g) periodically introducing a third fraction comprising relatively high boiling n-paraffin hydrocarbons into said dehydrogenation reaction zone in admixture with said first fraction and in the absence of said second fraction; (h) periodically recovering a third alkylate product comprising alkylbenzenes having an alkyl chain length corresponding to the mono-olefin hydrocarbons produced from said admixture of Step (g); (i) stopping the introduction of said third fraction as in Step (g) and thereafter repeating Step (d); and, (j) blending said recovered alkylate products in a manner to produce the desired detergent-grade alkylate.

Another embodiment of this invention includes the method hereinabove wherein said desired detergent-grade alkylate comprises a blend of said second and third alkylate products.

It is noted from the above description that the present invention relates to an improved method of operation wherein the n-paraffin hydrocarbon feedstocks are selectively segregated for charge to the olefin production unit in a manner which provides continuous operation without cross-contamination of products. In the past, the basic process, as described in the previously mentioned article, required a completely blocked-out operation in order to produce various grades of alkylates having a 3 or 4 or 5 carbon homolog spread. The avoidance of cross-contamination in such prior art processing resulted in considerable loss production during purging of the unit in order to remove the prevously produced products and/or previously used feedstocks. However, it is to be noted that in the practice of this invention the relatively intermediate boiling range n-paraffin hydrocarbons, such as a $C_{11}$–$C_{13}$ hydrocarbon fraction, is continuously processed through the system acting as its own purge with the lighter fraction or heavier fraction being cut into the feedstock mixture depending upon the quality of the desired alkylate product. Thus, it is seen that the present invention provides flexibility in producing a variety of detergent-grade alkylates without the usual attendant loss production time and/or product contamination problems.

The separation of straight-chain hydrocarbons from hydrocarbon mixtures may be accomplished by any means known to those skilled in the art. However, in the practice of this invention, it is distinctly preferable to use zeolytic molecular sieves to produce high purity n-paraffin hydrocarbons from a hydrocarbon mixture, such as kerosene. One prior art process for the separation of n-paraffins using molecular sieves is shown in U.S. Patent No. 2,920,037, issued on June 5, 1960. Another example is shown in U.S. Patent No. 2,957,927 which issued Oct. 25, 1960. Some of these prior art processes utilize a single bed system wherein one bed is maintained on an adsorption cycle and one bed on a desorption cycle. Other processes use the concept of simulated counter-current flow by moving the points of inlet and outlet of feed streams into and out of the bed using sorbents, such as molecular sieves. For example, such a prior art process is shown in U.S. Patent No. 2,958,589 which issued May 23, 1961. However, it is only important in the practice of this invention that the n-paraffin hydrocarbons be segregated into a relatively low boiling fraction, such as a $C_{10}$ n-paraffin hydrocarbon of high purity; a relatively intermediate boiling fraction, such as a $C_{11}$, $C_{12}$, and $C_{13}$ n-paraffin hydrocarbon fraction of high purity; and a relatively high boiling fraction, such as a $C_{14}$ n-paraffin hydrocarbon of high purity. The preferable way of producing these required fractions for the practice of the present invention is by distillation means since the boiling points between these varous fractions are sufficiently different for conventional distillation techniques to be used. However, other separation techniques known to those skilled in the art may be used to segregate the proper selected fractions of n-paraffin hydrocarbons for use as feedstock in the practice of the present invention.

The dehydrogenation reaction for the production of mono-olefin hydrocarbons from the proper n-paraffin hydrocarbon feedstock is generally carried out in the presence of a catalytic agent. The function of the catalyst is to permit the dehydrogenation of the paraffins to the mono-olefins without isomerization of the normal paraffins or the resulting mono-olefins to the corresponding branched-chain analog. Suitable catalytic agents for use in the paraffin dehydrogenation reaction include the neutral oxides of the elements of Group VI and metal sulfides and/or oxides of the metals of Group VIII of the Periodic Table. The preferable dehydrogenation catalyst comprises the noble metals or metal compounds, such as platinum and/or palladium disposed on a mutual or basic support, such as alumina. Those skilled in the art may find a detailed description of cataylsts for producing the preferred dehydrogenation reaction in copending application Ser. No. 590,490 filed Oct. 31, 1966, and the teachings of this latter copending application are incorporated herein to the extent necessary to provide information for those skilled in the art to practice the present invention.

Typical operating conditions for the dehydrogenation reaction zone utilizing the preferred catalyst hereinabove include relatively mild conditions of temperature and pressure, such as a temperature of about 870° F. and a pressure of about 30 p.s.i.g. Sufficient hydrogen is added to the reaction zone so that a mole ratio of hydrogen to combined feed of about 8 is maintained in the dehydrogenation reaction zone. Preferably, approximately 2000 parts per million of water is present in the combined feed to the dehydrogenation reaction zone.

The total hydrocarbon effluent from the dehydrogenation reaction zone is preferably admixed with benzene and passed into an alkylation reaction zone utilizing a catalytic agent, such as hydrofluoric acid. Typically, the olefin feedstock to the alkylation reaction contains from 10 to 15 carbon atoms per molecule, preferably, from 10 to 14 carbon atoms per molecule. This linear mono-olefin is utilized as an alkylating agent for an alkylatable compound, preferably an aromatic reactant comprising the hydrophobic group in the structure of the detergents to which this invention is ultimately directed. Suitable aromatic reactants may be selected from the group consisting of benzene, toluene, xylene, ethylbenzene, methylethylbenzene, diethylbenzene, phenol, mononitrobenzene, etc. Preferably, the aromatic reactant is benzene.

The alkylation reaction is effected in the presence of a suitable catalyst capable of promoting the condensation reaction. Generally, the catalyst incorporates an inorganic material characterized as an acid-acting compound which catalyzes the alkyl transfer reaction believed to be involved. Suitable catalysts include certain mineral acids, such as sulfuric acid containing not more than about 15% by weight of water and, preferably, less than about 8% by weight of water including used sulfuric acid catalyst recovered from the alkylation of isoparaffin hydrocarbons with mono-olefin hydrocarbons; hydrofluoric acid of at least 83% by weight and containing, preferably, less than about 10% by weight of water; liquefied anhydrous hydrogen fluoride; anhydrous alkyl chloride or alkyl bromide; borontrifluoride (preferably utilized in admixture with hydrofluoric acid); and other acid-acting catalysts. The catalyst particularly preferred for the present alkylation reaction is hydrogen fluoride containing at least 83% by weight and, more preferably, at least 90% by weight hydrogen fluoride.

The hydrocarbon effluent from the alkylation reaction zone is processed through recovery facilities which are well known to those skilled in the art and, preferably, include distillation means for separating unreacted benzene which is recycled to the alkylation zone, separation of unreacted n-paraffin hydrocarbons which may be recycled to the dehydrogenation reaction zone, and the separation of the desired detergent-grade alkylate from the heavier alkylate or residuum produced from the various reactions.

In the practice of this invention, from the teachings presented herein, it is evident that distillation means may be utilized to make this separation since the proper selection of feedstock to the system avoids the overlap in boiling point between the unreacted n-paraffin hydrocarbons for recycle and the desired alkylate product which has been produced.

The invention may be more fully understood with reference to the appended drawing which is a schematic representation for the practice of one embodiment of the present invention.

Description of the drawing

Referring now to the drawing, a petroleum kerosene which has been substantially desulfurized by hydrogenation is charged into the system via line 10 and subjected to extraction in zone 11, preferably, utilizing molecular sieves for the separation of normal paraffin hydrocarbons from the non-normal paraffin hydrocarbons. A typical analysis of a kerosene feed is as follows:

| Component: | Line 10 lb. moles/hr. |
|---|---|
| $i-C_9$ | 0.2 |
| $n-C_9$ | 0.1 |
| $i-C_{10}$ | 33.6 |
| $n-C_{10}$ | 10.0 |
| $i-C_{11}$ | 88.2 |
| $n-C_{11}$ | 26.1 |
| $i-C_{12}$ | 92.9 |
| $n-C_{12}$ | 26.8 |
| $i-C_{13}$ | 76.5 |
| $n-C_{13}$ | 22.5 |
| $i-C_{14}$ | 49.7 |
| $n-C_{14}$ | 13.6 |
| $i-C_{15}$ | 18.3 |
| $n-C_{15}$ | 4.6 |
| Aromatics | 72.2 |
| Total | 535.2 |
| Lbs./hr. | 91,000 |
| M.W. | 170.0 |
| BPSD | 7,790 |
| API | 45.0 |
| Lbs./gal. | 6.675 |

A raffinate stream comprising non-normal paraffin hydrocarbons is withdrawn from extraction unit 11, by conventional means not shown, and an extract phase comprising normal paraffin hydrocarbons having a carbon number from $C_{10}$ to $C_{16}$ is withdrawn from extraction unit 11 via line 12. A typical analysis of the material in line 12 is as follows:

| Component: | Line 12 lb. moles/hr. |
|---|---|
| $i-C_9$ | — |
| $n-C_9$ | 0.1 |
| $i-C_{10}$ | — |
| $n-C_{10}$ | 9.9 |
| $i-C_{11}$ | 0.1 |
| $n-C_{11}$ | 25.9 |
| $i-C_{12}$ | 0.1 |
| $n-C_{12}$ | 26.6 |
| $i-C_{13}$ | 0.1 |
| $n-C_{13}$ | 22.0 |
| $i-C_{14}$ | 0.1 |
| $n-C_{14}$ | 11.6 |
| $i-C_{15}$ | — |
| $n-C_{15}$ | 3.7 |
| Aromatics | 0.5 |
| Total | 100.7 |
| Lbs./hr. | 17,300 |
| M.W. | 171.8 |
| BPSD | 1,570 |
| API | 55.6 |
| Lbs./gal. | 6.296 |

The material in line 12 is passed into first fractionator 13 which is maintained under sufficient conditions of temperature and pressure to produce overhead in line 14 a distillate product comprising $C_{10}$ n-paraffin hydrocarbons. A bottoms product containing $C_{11}$–$C_{16}$ paraffin hydrocarbons is withdrawn from fractionator 13 via line 15. Typically, fractionator 13 is operated at a temperature of 215° F. in the overhead and 495° F. in the bottoms utilizing a top column pressure of about 15 p.s.i.g. Utilizing these typical operating conditions, the analysis of the material in line 14 is as follows:

| Component: | Line 14 lb. moles/hr. |
|---|---|
| $i-C_9$ | — |
| $n-C_9$ | 0.1 |
| $i-C_{10}$ | — |
| $n-C_{10}$ | 9.9 |
| $i-C_{11}$ | 0.1 |
| $n-C_{11}$ | 1.3 |
| $i-C_{12}$ | — |
| $n-C_{12}$ | — |
| $i-C_{13}$ | — |
| $n-C_{13}$ | — |
| $i-C_{14}$ | — |
| $n-C_{14}$ | — |
| $i-C_{15}$ | — |
| $n-C_{15}$ | — |
| Aromatics | 0.1 |
| Total | 11.5 |
| Lbs./hr. | 1,660 |
| M.W. | 144.3 |
| BPSD | 155 |
| API | 61.0 |
| Lbs./gal. | 6.119 |

A typical analysis of the material in line 15 is as follows:

| Component: | Line 15 lb moles/hr. |
|---|---|
| $i-C_9$ | — |
| $n-C_9$ | — |
| $i-C_{10}$ | — |
| $n-C_{10}$ | — |
| $i-C_{11}$ | — |
| $n-C_{11}$ | 24.6 |
| $i-C_{12}$ | 0.1 |
| $n-C_{12}$ | 26.6 |
| $i-C_{13}$ | 0.1 |
| $n-C_{13}$ | 22.0 |
| $i-C_{14}$ | 0.1 |
| $n-C_{14}$ | 11.6 |
| $i-C_{15}$ | — |
| $n-C_{15}$ | 3.7 |
| Aromatics | 0.4 |
| Total | 89.4 |
| Lbs./hr. | 15,640 |
| M.W. | 175.3 |
| BPSD | 1,415 |
| API | 55.0 |
| Lbs./gal. | 6.316 |

The material in line 15 is introduced into fractionator 16 which is maintained under sufficient conditions of temperature and pressure to produce a concentrate of normal paraffin hydrocarbons having from $C_{11}$ through $C_{13}$ carbon atoms per molecule in line 17 and producing a bottoms product comprising $C_{14}$ + n-paraffin hydrocarbons which is withdrawn from fractionator 16 via line 18. Typical operating conditions for fractionator 16 include an overhead temperature of 380° F., a bottoms temperature of about 465° F. with approximately atmospheric pressure being maintained therein. Operating under these typical conditions, an analysis of the material in line 17 is as follows:

| Component: | Line 17 lb. moles/hr. |
|---|---|
| i-$C_9$ | — |
| n-$C_9$ | — |
| i-$C_{10}$ | — |
| n-$C_{10}$ | — |
| i-$C_{11}$ | — |
| n-$C_{11}$ | 24.6 |
| i-$C_{12}$ | 0.1 |
| n-$C_{12}$ | 26.6 |
| i-$C_{13}$ | 0.1 |
| n-$C_{13}$ | 20.9 |
| i-$C_{14}$ | — |
| n-$C_{14}$ | — |
| i-$C_{15}$ | — |
| n-$C_{15}$ | — |
| Aromatics | 0.3 |
| Total | 72.6 |
| Lbs./hr. | 12,310 |
| M.W. | 170.0 |
| BPSD | 1,120 |
| API | 56.1 |
| Lbs./gal. | 6.280 |

Similarly, an analysis of the material in line 18 is as follows:

| Component: | Line 18 lb. moles/hr. |
|---|---|
| i-$C_9$ | — |
| n-$C_9$ | — |
| i-$C_{10}$ | — |
| n-$C_{10}$ | — |
| i-$C_{11}$ | — |
| n-$C_{11}$ | — |
| i-$C_{12}$ | — |
| n-$C_{12}$ | — |
| i-$C_{13}$ | — |
| n-$C_{13}$ | 1.1 |
| i-$C_{14}$ | 0.1 |
| n-$C_{14}$ | 11.6 |
| i-$C_{15}$ | — |
| n-$C_{15}$ | 3.7 |
| Aromatics | 0.1 |
| Total | 16.6 |
| Lbs./hr. | 3,330 |
| M.W. | 200.6 |
| BPSD | 295 |
| API | 51.5 |
| Lbs./gal. | 6.437 |

The material in line 18 is next introduced into fractionator 19 maintained under conditions sufficient to produce a $C_{14}$ n-paraffin hydrocarbon concentrate which is withdrawn via line 21 and a $C_{15}$+ n-paraffin reject stream which is withdrawn from the system via line 20. Typical operating conditions which may be used in fractionator 19 include an overhead temperature of about 510° F. and a bottoms temperature of about 555° F. utilizing approximately atmospheric pressure in the column. Under these conditions, the material in line 21 will have the following typical analysis:

| Component: | Line 21 lb. moles/hr. |
|---|---|
| i-$C_9$ | — |
| n-$C_9$ | — |
| i-$C_{10}$ | — |
| n-$C_{10}$ | — |
| i-$C_{11}$ | — |
| n-$C_{11}$ | — |
| i-$C_{12}$ | — |
| n-$C_{12}$ | — |
| i-$C_{13}$ | — |
| n-$C_{13}$ | 1.1 |
| i-$C_{14}$ | 0.1 |
| n-$C_{14}$ | 10.8 |
| i-$C_{15}$ | — |
| n-$C_{15}$ | — |
| Aromatics | 0.1 |
| Total | 12.1 |
| Lbs./hr. | 2,380 |
| M.W. | 196.7 |
| BPSD | 215 |
| API | 54.7 |
| Lbs./gal. | 6.326 |

Similarly, the material in line 20 will have the following typical analysis:

| Component: | Line 20 lb. moles/hr. |
|---|---|
| i-$C_9$ | — |
| n-$C_9$ | — |
| i-$C_{10}$ | — |
| n-$C_{10}$ | — |
| i-$C_{11}$ | — |
| n-$C_{11}$ | — |
| i-$C_{12}$ | — |
| n-$C_{12}$ | — |
| i-$C_{13}$ | — |
| n-$C_{13}$ | — |
| i-$C_{14}$ | — |
| n-$C_{14}$ | 0.8 |
| i-$C_{15}$ | — |
| n-$C_{15}$ | 3.7 |
| Aromatics | — |
| Total | 4.5 |
| Lbs./hr. | 950 |
| M.W. | 211.1 |
| BPSD | 80 |
| API | 52.5 |
| Lbs./gal. | 6.402 |

Referring again to fractionator 13, the $C_{10}$ n-paraffin hydrocarbon stream in line 14 is passed into storage tank 22 for use more fully described hereinafter. In similar fashion, the $C_{14}$ n-paraffin hydrocarbon material in line 21 is passed into storage tank 23 for use more fully described hereinafter.

The $C_{11}$–$C_{13}$ n-paraffin hydrocarbons concentrate stream (relatively intermediate boiling range) is passed continuously via line 17 into olefin production zone 28 which is maintained under conditions substantially described hereinabove. A product stream containing corresponding linear olefin hydrocarbons comprising approximately 95% mono-olefins is removed from zone 28 via line 29. Of the remaining 5% of the olefins, the major portion comprises dienic compounds. These olefinic materials comprise about 10% (mol basis) of the total material in line 29 with the remainder (about 90%) comprising unreacted n-paraffin hydrocarbons. A by-product of the dehydrogenation reaction is hydrogen of 96% purity which is removed from zone 28, by conventional means not shown.

The hydrocarbon effluent from dehydrogenation zone 28 in line 29 is admixed with benzene from line 30 and the mixture of mono-olefins, n-paraffins, and benzene is passed via line 29 into alkylation unit 31 which is maintained under conditions previously described hereinabove. The hydrocarbon phase from alkylation unit 31 is passed via line 32 into fractionator 33 which is maintained under conditions sufficient to separate unreacted benzenes from alkylated benzenes. The unreacted benzene is removed as a distillate product from fractionator 33 and, preferably, recycled to the alkylation unit 31 via lines 34 and 30. Typical operating conditions for the fractionator 33 includes an overhead temperature of about 200° F. and a bottoms temperature of about 455° F. while maintaining a pressure of about 10 p.s.i.g. in the bottom of the column. Operating under these conditions, the material in line 34 will have the following analysis:

| Component: | Line 34 lb. mol./hr. |
|---|---|
| Benzene | 175.58 |
| Non-aromatics | 9.61 |
| Total | 185.19 |
| Lb./hr. | 14,522 |
| BPD | 1,133 |
| Lbs./gal. | 7.33 |
| M.W. | 78.4 |

Similarly, the material in line 35 which comprises alkylbenzenes and paraffins will have the following typical analysis:

| Component: | Line 35 lb. mol./hr. |
|---|---|
| $n-P_{11}$ | 249 |
| $n-P_{12}$ | 239 |
| $n-P_{13}$ | 169 |
| Iso+cyclics | 25 |
| Aromatics | 12 |
| $n-P_{11}$ alkylbenzene | 24 |
| $n-P_{12}$ alkylbenzene | 27 |
| $n-P_{13}$ alkylbenzene | 21 |
| Other D.A. | 2 |
| Heavy alkylate | 3 |
| Tar | — |
| Total | 746 |

The material in line 35 comprising n-paraffin hydrocarbons admixed with alkylbenzenes is introduced from line 35 into fractionator 36 which is maintained under conditions sufficient to separate the normal paraffin hydrocarbons from the alkylbenzenes. The normal paraffins are withdrawn from fractionator 36 via line 37 and, preferably, recycled to olefin production unit 28 in admixture with the material in line 17. Typical operating conditions for fractionator 36 include an overhead temperature of about 285° F. and a bottoms temperature of about 485° F. while maintaining a pressure of about 200 mm. Hg absolute in the bottom of the column. Operating under these conditions, the material in line 37 will have the following analysis:

| Component: | Line 37 lb. mol./hr. |
|---|---|
| $n-P_{11}$ | 245 |
| $n-P_{12}$ | 235 |
| $n-P_{13}$ | 167 |
| Iso+cyclics | 24 |
| Aromatics | 12 |
| Total | 683 |

Similarly, the material in line 38 will have the following analysis:

| Component: | Line 38 lb. mol./hr. |
|---|---|
| $n-P_{11}$ alkylbenzene | 24 |
| $n-P_{12}$ alkylbenzene | 27 |
| $n-P_{13}$ alkylbenzene | 21 |
| Other D.A. | 2 |
| Heavy alkylate | 3 |
| Total | 77 |

The alkylbenzene material in line 38 is introduced into rerun column or fractionator 39 for the separation of the desired alkylate product which is removed via line 41 and passed subsequently into proper segregated storage. A reject stream comprising heavy alkylate is withdrawn from fractionator 39 via line 40. Typical operating conditions for fractionator 39 include an overhead temperature of about 360° F. and a bottoms temperature of about 550° F. while maintaining a pressure of about 15 mm. Hg absolute in the top of the column. For the flow scheme just described, the material in line 41 comprises an alkylbenzene having from $C_{11}$–$C_{13}$ carbon numbers in the alkyl side-chain, i.e., a 3-carbon number homolog spread in the alkyl side-chain.

While processing the material continuously in line 17, control valves 25 and 27 are in a closed position.

Periodically control valve 25 is open, thereby introducing relatively light normal paraffin hydrocarbons from storage tank 22 via line 24 into line 17 for admixture with the relatively intermediate boiling range normal paraffin hydrocarbons which are continuously being processed through the system from line 17. The admixture of material from line 24 and line 17 is processed through olefin production unit 31 under substantially the same conditions previously described hereinabove. However, in this case, the desired alkylate product being removed to segregated storage (not shown) via line 41 contains alkylbenzene having a $C_{10}$–$C_{13}$ carbon number alkyl side-chain, i.e. a 4-carbon number homolog spread in the alkyl side-chain. For this case, the four carbon number homolog spread in line 41 is designated broadly as a second alkylate product while the material produced from only $C_{10}$–$C_{13}$ paraffin hydrocarbons in line 17 is designated broadly as a first alkylate product.

The introduction of the relatively light normal paraffin hydrocarbons is stopped at a predetermined time by closing valve 25. Operation of the plant continues by the continuous introduction of material from line 17 through the various processing units for a time sufficient to purge these units of the feedstock and products produced during the cycle in which material from line 24 was being processed. With valve 25 and 27 closed, the operation of purging continues with the segregation of material from line 41 being sent to storage as the first alkylate product.

Following purging of the unit with the material only from line 17 and with valve 25 closed for a sufficient predetermined amount of time, valve 27 is now open permitting the passage of relatively heavy n-paraffin hydrocarbons from storage tank 23 via line 26 into line 17 in admixture with the relatively intermediate boiling range n-paraffin material. Thus, the admixture of relatively intermediate material and relatively heavy material is now processed through olefin production unit 28, alkylation unit 31 into subsequent separation facilities in substantially the same manner and under substantially the same conditions as previously described for processing only the material in line 17. However, in this latest case, the alkylbenzene product being removed in line 41 now designated broadly as a third alkylate product contains alkylbenzenes having from $C_{11}$–$C_{14}$ in the alkyl side-chain, i.e. a four carbon number homolog spread in the alkyl side-chain. This relatively heavy alkylate material in line 41 is sent to segregated storage (not shown).

Depending upon the demands of the market place, the various segregated alkylate products are now blended to produce the desired alkylate product. For example, a blend of the second alkylate product and the third alkylate product will produce a desired alkylate product of detergent-grade quality having a 5-carbon number homolog spread, i.e. $C_{10}$–$C_{14}$ carbon numbers in the alkyl sidechain. In other words, in the latter example, the desired detergent-grade alkylate comprises a mixture of alkylbenzene hydrocarbons containing from $C_{10}$–$C_{14}$ carbon atoms in the alkyl side-chains.

For convenience, the various segregated storage facilities for the various alkylate products have not been shown in the appended drawing. Those skilled in the art know well how to construct such segregated storage and blending facilities.

The invention claimed:

1. Method for producing detergent-grade alkylate which comprises the steps of:
  (a) continuously introducing a first fraction comprising relatively intermediate boiling range n-paraffin hydrocarbons into a dehydrogenation reaction zone maintained under conditions sufficient to convert n-paraffin hydrocarbons into corresponding straight-chain mono-olefin hydrocarbons;
  (b) continuously passing the hydrocarbon effluent from said dehydrogenation reaction zone into a benzene alkylation reaction zone maintained under conditions sufficient to produce an alkylate comprising alklbenzene hydrocarbons having an alkyl chain length corresponding to the chain length of said mono-olefin hydrocarbons;
  (c) recovering a first alkylate product comprising alkylbenzenes having an alkyl chain length corresponding to the mono-olefin hydrocarbons produced from said first fraction;
  (d) periodically introducing a second fraction comprising relatively low boiling n-paraffin hydrocarbons into said dehydrogenation reaction zone in admixture with said first fraction and in the absence of hereinafter specified third fraction;
  (e) periodically recovering a second alkylate product comprising alkylbenzenes having an alkyl chain length corresponding to the mono-olefin hydrocarbons produced from said admixture of Step (d);
  (f) stopping the introduction of said second fraction as in Step (d);
  (g) periodically introducing a third fraction comprising relatively high boiling n-paraffin hydrocarbons into said dehydrogenation reaction zone in admixture with said first fraction and in the absence of said second fraction;
  (h) periodically recovering a third alkylate product comprising alkylbenzenes having an alkyl chain length corresponding to the mono-olefin hydrocarbons produced from said admixture of Step (g);
  (i) stopping the introduction of said third fraction as in Step (g) and thereafter repeating Step (d); and,
  (j) blending said recovered alkylate products in a manner to produce the desired detergent-grade alkylate.

2. Method according to claim 1 wherein said desired detergent-grade alkylate comprises a blend of said second and third alkylate products.

3. Method according to claim 1 wherein said first fraction comprises $C_{11}$ to $C_{13}$ n-paraffin hydrocarbons, said second fraction comprises $C_{10}$ n-paraffin hydrocarbons, and said third fraction comprises $C_{14}$ n-paraffin hydrocarbons.

4. Method according to claim 3 wherein said desired detergent-grade alkylate comprises a mixture of said alkylbenzene hydrocarbons containing from $C_{10}$–$C_{14}$ carbon atoms in the alkyl chain.

References Cited

UNITED STATES PATENTS

| | | | |
|---|---|---|---|
| 3,320,714 | 5/1967 | Rubinfeld | 260—671 |
| 3,349,141 | 10/1967 | Sweeney | 260—668 |
| 3,358,047 | 12/1967 | Liston | 260—668 |

DELBERT E. GANTZ, *Primary Examiner.*

CURTIS R. DAVIS, *Assistant Examiner.*